(12) United States Patent
Valadares (10) Patent No.: US 11,549,313 B2
(45) Date of Patent: Jan. 10, 2023

(54) DEVICE, SYSTEM AND METHOD FOR TRANSPORTING AND INSTALLING A BOP STACK FOR AN ONSHORE DRILLING RIG

(71) Applicant: PETRÓLEO BRASILEIRO S.A.—PETROBRAS, Rio de Janeiro (BR)

(72) Inventor: Raphael Lucas Ribeiro Valadares, Rio Grande do Norte (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 16/755,552

(22) PCT Filed: Oct. 11, 2018

(86) PCT No.: PCT/GB2018/052914
§ 371 (c)(1),
(2) Date: Apr. 10, 2020

(87) PCT Pub. No.: WO2019/073240
PCT Pub. Date: Apr. 18, 2019

(65) Prior Publication Data
US 2020/0291727 A1    Sep. 17, 2020

(30) Foreign Application Priority Data

Oct. 11, 2017 (BR) .......................... 102017021920-8

(51) Int. Cl.
*E21B 33/06* (2006.01)
*E21B 15/00* (2006.01)
*F16M 3/00* (2006.01)

(52) U.S. Cl.
CPC ............ *E21B 15/003* (2013.01); *E21B 33/06* (2013.01); *F16M 3/00* (2013.01)

(58) Field of Classification Search
CPC .......... E21B 15/003; E21B 33/06; F16M 3/00
See application file for complete search history.

(56) References Cited

U.S. PATENT DOCUMENTS 4,359,089 A    11/1982    Strate et al.
5,121,793 A *    6/1992    Busch .................... E21B 33/02
                                                          166/79.1

(Continued)

OTHER PUBLICATIONS

International Search Report and Written Opinion corresponding to PCT/GB2018/052914 dated Jan. 2, 2019.

*Primary Examiner* — Taras P Bemko
(74) *Attorney, Agent, or Firm* — Arentfox Schiff LLP (57) ABSTRACT

The present invention relates to devices and methods for transporting a Blow Out Preventer (BOP). A device for transporting and installing a BOP stack for a land-based drilling rig, comprises a skid for transporting a BOP stack in a substantially horizontal position. The device comprises a moveable support configured to be fixed removably to one end of the BOP stack and to translate longitudinally on the skid, where a section of the skid is extendable longitudinally outwards from an end of the skid, into an extended configuration in which the section can placed adjacent to or on a place of installation of the BOP stack, and is configured to be part of the skid on which the moveable support is configured to translate, so that the moveable support may translate longitudinally onto the section of the skid, in its extended configuration, to be above the place of installation.

19 Claims, 10 Drawing Sheets

(56) References Cited

U.S. PATENT DOCUMENTS

| | | | |
|---|---|---|---|
| 6,902,007 B1 * | 6/2005 | Orr | E21B 19/00 166/379 |
| 7,086,474 B1 | 8/2006 | Trevithick et al. | |
| 9,488,023 B2 | 11/2016 | Vogt et al. | |
| 9,580,977 B2 | 2/2017 | Vogt | |
| 2015/0330556 A1 | 11/2015 | Shamas et al. | |

* cited by examiner

DEVICE, SYSTEM AND METHOD FOR TRANSPORTING AND INSTALLING A BOP STACK FOR AN ONSHORE DRILLING RIG

CROSS-REFERENCE TO RELATED APPLICATION

This application is a U.S. National Stage entry under 35 U.S.C. § 371 based on International Application PCT/GB2018/052914, filed on Oct. 11, 2018, which claims the benefit of priority to BR 10 2017 021920-8, filed Oct. 11, 2017 which is incorporated herein by reference in its entirety.

FIELD OF THE INVENTION

The present invention relates to devices and methods for transporting heavy items of equipment. More particularly, the present invention relates to devices and methods for transporting a blow out preventer (BOP) stack.

BACKGROUND OF THE INVENTION

An oil and/or gas exploration well is constructed by means of a drilling rig, which may be onshore or offshore. The offshore drilling rig incorporates, in a single hull or ship, all the systems and equipment necessary for drilling an oil well at sea. In contrast to the offshore rig, the land rig must be dismantled, transported and installed systematically at each site where a new well is to be constructed. This operation is known as DTM (Dismounting, Transport and Mounting). Due to this requirement, such rigs are of modular design to make it possible to transport the components by road, rafts, helicopter and even aeroplanes.

Any time when a rig is not drilling represents a loss of revenue for its operator, and for this reason the time taken for mounting, transport and dismounting is preferably as short as possible. Accordingly, equipment specifically designed for reducing the DTM time becomes economically advantageous.

One of the tasks of DTM that demands considerable time and work is the mounting, transport and dismounting of the blow out preventer (BOP). The BOP is essentially a large high-pressure valve, installed in the well for shutting it down in emergency. Owing to its purpose, the BOP is usually made entirely of carbon steel, and is therefore of considerable weight and volume. In major land-based drilling rigs (rigs capable of drilling 5000 metres or more), the BOP may have configurations with a height of more than 6 metres, and reach a weight above 35 tons.

To make it possible for this equipment to be installed on the well, it is made in modular form (with modules such as the Annular BOP, Double Ram BOP, Single Ram BOP, Drilling Spool), called the BOP stack when mounted in succession on the well. These components are joined together by means of massive flanged connections that must be bolted to guarantee hermeticity of the BOP stack. For each connection, on average 20 massive bolts must be tightened with a torque wrench (for the case of flanges API 13 5-8 inch 10 000 psi). This operation generally takes many hours and presents a risk of accidents, since the bolts are tightened using hammers and/or a hydraulic wrench in a slippery location (due to the drilling fluid) with difficult access.

On completion of drilling, the BOP stack is removed from the well by dismantling its individual components. A work team "climbs" the BOP stack (i.e. works at height) and "breaks" the torque of the bolts that join together the flanges of the components of the BOP stack. This task is carried out with a safety belt, on an irregular, slippery surface, using a hammer and/or hydraulic wrench, increasing the risk of accidents. Due to the number of bolts on each flange, their position and the difficulty of "breaking" the torque, dismantling can take more than ten hours.

Figure 1:
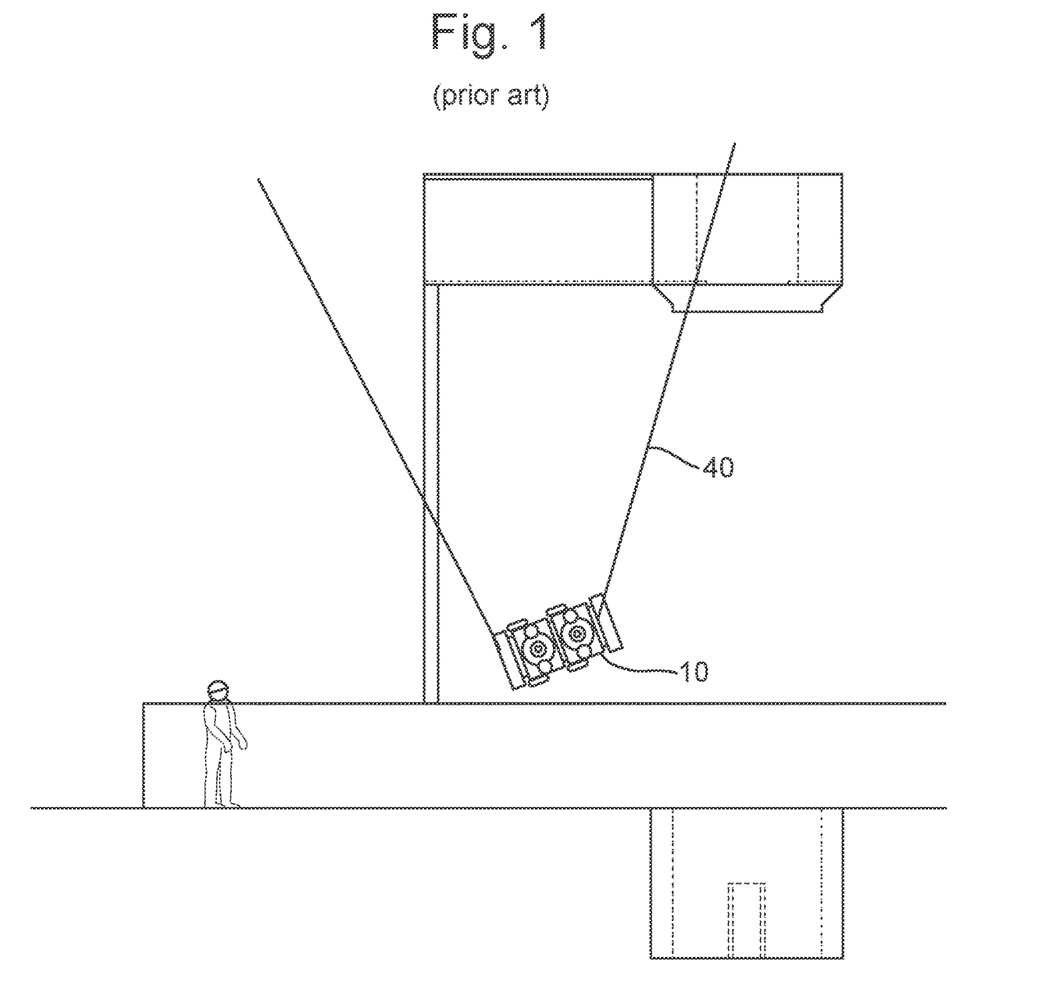
FIG. 1 shows a schematic side view of an improvised method for transporting and installing a BOP used in the prior art.

On rigs that do not have a dedicated system (which is the vast majority), movement of the components is carried out in an improvised manner, as illustrated in FIG. 1. The rig winch (steel cable 40 fixed to the BOP 10 and to the hook of the lifting system) and a crane positioned externally to the substructure performs translation of the component between the well and the area outside the substructure. The components are anchored at two improvised points since the BOP is not designed for this type of movement. One point is raised by the steel cable of the crane and the other point by the steel cable of the rig winch. The movement of the two cables performs translation of the BOP from the well to the area outside the substructure of the rig.

Not infrequently, in these cases, the cable suffers abrasion due to contact thereof with the edges of the substructure, reducing its useful life and putting its use at risk. Moreover, due to the improvised and irregular nature of this movement, inadvertent turning of the components is not uncommon, putting the teams around it at risk. Furthermore, movement of loads by the crane with a steel cable on the diagonal is irregular and breaks various rules for movement of loads.

Some existing solutions in the market perform movement of the BOP stack. For example, an aerial trolley is a dedicated mechanical system for moving loads, consisting of a trolley on wheels (also called a "car") that moves along a fixed rail below the substructure of the rig. This car has a winch that is capable of lifting individual components of the BOP stack. However, the aerial trolley does not perform translation of the BOP stack on the ground and does not have the capacity for loading the BOP stack in a single step.

Figure 2:
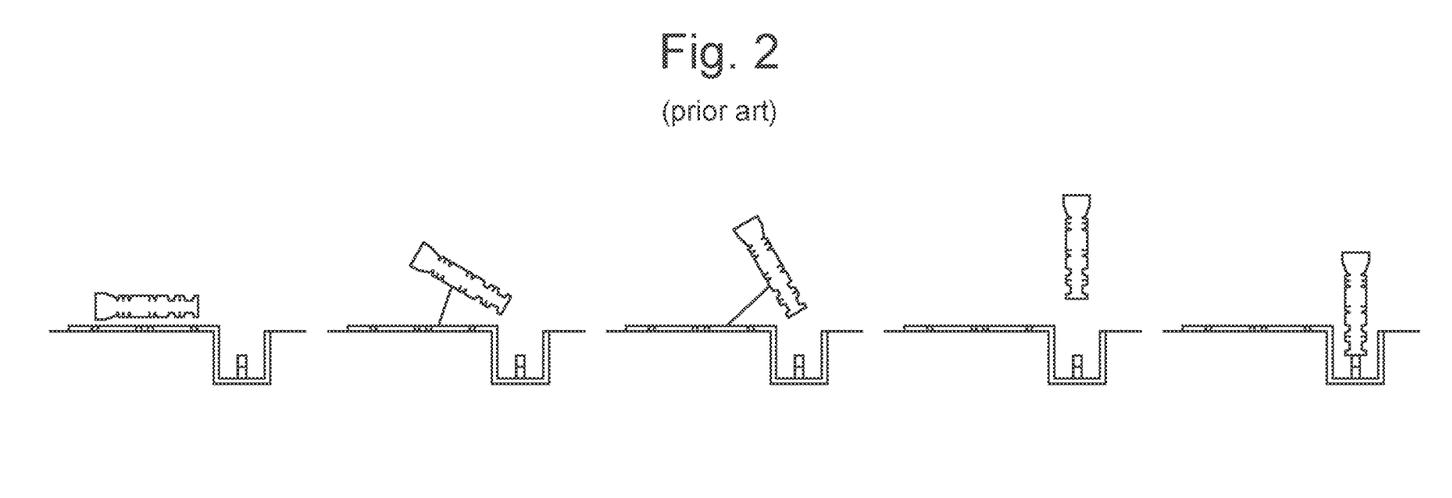
FIG. 2 shows a sequence of schematic side views of a method for transporting and installing a BOP using hydraulic actuators, as known in the prior art.

Various other systems exist for movement, transport and installation of the BOP stack, generally comprising a skid and hydraulic actuators for driving an arm capable of moving the BOP stack between the horizontal position (transport) and vertical position (assembly), as illustrated in FIG. 2.

Document U.S. Pat. No. 4,359,089A, for example, presents a transporter/manipulator for a BOP including a skid defined by a pair of sides with transverse bars extending between them; a sliding carriage mounted on rollers on the skid for the movement for approaching and moving away from a wellhead; and a cradle mounted swivelling on the transporter for transporting the BOP in the horizontal position and for movement from the horizontal position to the vertical position. Hydraulic cylinders are provided for moving the transporter along the skid, for moving the car transversely to align the BOP with the wellhead, for moving the support from the horizontal to the vertical position, and for moving the BOP and a sliding portion of the support vertically into and out of coupling with a lining of the well.

Document US20150330556A1 discloses a "cart" for transporting and storing a BOP comprising a platform. The platform has a mounting position suitable for receiving the BOP. A cart back extends perpendicularly to the platform and includes a mounting feature positioned for securing the BOP. The cart as a whole may be positioned with the BOP horizontal, e.g. for transportation, or vertical.

Document U.S. Pat. No. 9,488,023B2 discloses an assembly comprising a mounting structure movable between a storage and transport position, parallel to a base frame, and a mounting position perpendicular to it. An adjustable BOP cradle retains the BOP in the mounting structure. A pivot pin permits rotation of the mounting structure relative to the base frame. A plurality of flange locks are connected adjustably to the mounting structure for fixing the BOP. An actuating mechanism moves the mounting structure between the storage and transport position and the installation position. Once the blowout preventer is in a vertical position, it is moved off the assembly. A lift mechanism may be utilized to lift the blowout preventer from the assembly 10 and move it in place over a well center line.

Document U.S. Pat. No. 9,580,977B2 describes a system for transporting a BOP. The system comprises a skid for receiving the BOP. A pair of parallel beams spaced relative to the skid are movable between a lowered storage position and a raised position of use. A transporting mechanism is provided on the beams. A hydraulic cylinder provided for moving the beams from the lowered storage position to the raised position of use. However, once the BOP is in the horizontal position it is not over the well centre line. As a result, a hoist mechanism is subsequently used to move the BOP (in the vertical position) horizontally until it is over the well centre line.

The items of equipment described in documents U.S. Pat. No. 4,359,089A, US20150330556A1, U.S. Pat. No. 9,488,023B2 and U.S. Pat. No. 9,580,977B2 are, however, quite expensive owing to their complexity and robustness, as they have hydraulic systems dedicated exclusively to lifting, positioning and installing the BOP stack.

Thus, there is in the prior art a need for equipment for transporting the BOP that is of less complex construction, and that provides equipment already installed on site for lifting, positioning and installing the BOP stack, dispensing with complex dedicated hydraulic systems.

As will be described in greater detail below, the present invention aims to solve the problem of the prior art described above in a practical and efficient manner.

SUMMARY OF THE INVENTION

The present invention aims to provide a device, system and method for transporting and installing a BOP stack that utilizes the power of the drilling rig for safely lifting and installing the BOP stack.

According to a first aspect of the present invention, there is provided a device for transporting and installing a BOP stack for a land-based drilling rig, comprising one or more of: a skid for transporting a BOP stack in a substantially horizontal position; and a moveable support configured to be fixed removably to one end of the BOP stack and to translate longitudinally on the skid; wherein a section of the skid is extendable longitudinally outwards from an end of the skid, into an extended configuration in which the section can placed adjacent to or on a place of installation of the BOP stack, and is configured to be part of the skid on which the moveable support is configured to translate, so that the moveable support may translate longitudinally onto the section of the skid, in its extended configuration, to be above the place of installation.

This device can transport the BOP stack in a horizontal position (which is more convenient for transport) and deliver a BOP stack in a vertical orientation, ready for installation, directly above the place of installation.

Optionally, the skid comprises at least one rail, and the moveable support is configured to slide longitudinally on the at least one rail.

Optionally, a portion of the at least one rail is part of the section of the skid that is extendable longitudinally outwards, such that the portion of the at least one rail is configured to extend on the place of installation of the BOP stack when the device is positioned adjacent to the place of installation.

Optionally, the section of the skid that is extendable longitudinally is retractable.

Optionally, the moveable support comprises a hinged fastening device configured to fix one end of the BOP stack to be hinged with respect to the sliding support.

Optionally, the moveable support comprises a hinge axis about which the hinged fastening device rotates.

Optionally, the moveable support is configured to be fastened removably to the lower end of the BOP stack.

Optionally, the skid comprises at least one locking element for removably fastening the skid on or to the structure of a rig.

Optionally, the at least one locking element comprises at least two arms.

According to a second aspect of the invention, there is provided, a system for transporting and installing a BOP stack for a land-based drilling rig, the system comprising a device for transporting and installing a BOP stack, as defined in the first aspect of the invention, and a rig.

Optionally, the rig is positionable to be aligned above a place of installation of a BOP stack at which the device for transporting and installing a BOP stack is positioned carrying a BOP stack, and wherein the rig is configured to hoist the BOP stack by an end of the BOP stack opposite to an end fixed to the movable support so as to lift the BOP stack to a vertical position where the movable support is positioned on the section of the skid that extends on the place of installation; and wherein the rig is configured to lower the BOP stack in the vertical position to the place of installation after disconnection of the BOP stack from the movable support.

Optionally, the system further comprising: a BOP stack, wherein the BOP stack comprises at least one hoisting flange fixed to the upper end of the BOP stack; and wherein the rig is configured to hoist the BOP stack by the at least one hoisting flange.

According to a third aspect of the invention, there is provided a method for transporting and installing a BOP stack for a land-based drilling rig, the method comprising one or more of the the steps of: a) transporting a BOP stack to the vicinity of a place of installation in a substantially horizontal position by means of a device for transporting and installing a BOP stack; b) hoisting, by means of a rig positioned above the place of installation and aligned therewith, the BOP stack by a top end of the BOP stack so as to: (i) lift the top end of the BOP stack away from the device for transporting and installing the BOP stack, (ii) bring the BOP stack into a vertical position wherein a bottom end of the BOP stack remains attached to the device for transporting and installing the BOP stack via a moveable support of the device for transporting and installing the BOP stack, and wherein the BOP stack is positioned above the place of installation.

Optionally, the method further comprises disconnecting the moveable support from the bottom end of the BOP stack and displacing the moveable support so as to unblock the entrance of the place of installation.

Optionally, the method further comprises lowering the BOP stack in its vertical position to the place of installation by means of the rig.

Optionally, the method further comprises connecting the device for transporting and installing the BOP stack to the rig before the step of hoisting.

Optionally, the step of lowering the BOP stack further comprises leaving the device for transporting and installing the BOP stack in place during the lowering.

Optionally, the device for transporting and installing a BOP stack is the device of the first aspect of the invention.

According to a fourth aspect of the invention, there is provided a device for transporting and installing a BOP stack for a land-based drilling rig, comprising: a skid for transporting a BOP stack in a substantially horizontal position; and a moveable BOP stack support configured to move along the skid; a skid extension, moveable between an extended position and an unextended position; wherein the moveable BOP stack support can move along the skid extension when the skid extension is in the extended position; and wherein the moveable BOP stack support comprises a rotatable connector for connecting to a first end of a BOP stack, such that the moveable BOP stack can move along the skid and remain connected to the first end of a BOP stack if the second end of the BOP stack is lifted.

According to a firth aspect of the invention, there is provided a device for transporting and installing a BOP stack for a land-based drilling rig, comprising (i) a skid formed by a metallic structure suitable for transporting the BOP stack in the horizontal position, (ii) a sliding support suitable for being fixed removably to one end of the BOP stack to support part of the weight of the BOP stack, the sliding support additionally being suitable for sliding longitudinally on at least part of the skid, and (iii) at least one fixed support for supporting the BOP stack and suitable for supporting part of the weight of the BOP stack when in its position of rest in the horizontal, wherein at least part of the skid on which the sliding support slides extends longitudinally outwards from the end of the skid adjacent to the place of installation of the BOP stack, so that at least part of the skid on which the sliding support slides remains positioned on the place of installation of the BOP stack.

According to a sixth aspect of the invention, there is provided a system for transporting and installing a BOP stack for a land-based drilling rig, comprising the device for transporting and installing a BOP stack as described above, wherein a rig, positioned above the place of installation and aligned therewith, is suitable for (i) hoisting the BOP stack by its end opposite to the end fixed to the sliding support so as to raise the BOP stack to a vertical position where the sliding support is positioned on the part of the skid that extends over the place of installation, and (ii) lowering the BOP stack in the vertical position to the place of installation after disconnection thereof from the sliding support.

According to a seventh aspect of the invention, there is provided a method for transporting and installing a BOP stack for a land-based drilling rig, comprising one or more of the the steps of: a) transporting the BOP stack to the vicinity of the place of installation in a horizontal position by means of a device for transporting and installing a BOP stack, as described above; b) hoisting, by means of the rig positioned above the place of installation and aligned therewith, the BOP stack by its end opposite to the end fixed to the sliding support so as to raise the BOP stack to a vertical position where the sliding support is positioned on the part of the skid that extends over the place of installation; c) disconnecting the sliding support from the end of the BOP stack to which the latter was fixed and displacing at least part of the skid so as to unblock the entrance of the place of installation; and d) lowering the BOP stack in its vertical position to the place of installation by means of the rig positioned above the place of installation and aligned therewith.

According to an eighth aspect of the invention, there is provided a device for transporting and installing a BOP stack (10) for a land-based drilling rig, comprising: a skid (12) formed by a metallic structure suitable for transporting the BOP stack (10) in the horizontal position, characterized in that it additionally comprises: a sliding support (14) suitable for being fixed removably to one end of the BOP stack (10) to support part of the weight of the BOP stack (10), the sliding support (14) additionally being suitable for sliding longitudinally on at least part of the skid (12); and at least one fixed support (16) for supporting the BOP stack (10) and suitable for supporting part of the weight of the BOP stack (10) when in its position of rest in the horizontal, wherein at least part (20) of the skid (12) on which the sliding support (14) slides and extends longitudinally outwards from the end of the skid (12) adjacent to the place of installation (22) of the BOP stack (10), so that at least part (20) of the skid (12) on which the sliding support (14) slides remains positioned on the place of installation of the BOP stack (10).

Optionally, the sliding support (14) slides longitudinally on at least one rail on the skid (12).

Optionally, the at least one rail (20) extends at least partially on the place of installation (22) of the BOP stack (10) when the device is positioned adjacent to the place of installation (22)

Optionally, the portion of the at least one rail (20) that extends on the place of installation (22) of the BOP stack (10) is retractable.

Optionally, the sliding support (14) comprises a hinged fastening device (16), suitable for fixing one end of the BOP stack (10) hinged with respect to the sliding support (14).

Optionally, the sliding support (14) comprises a hinge axis (14e) about which the hinged fastening device (16) rotates.

Optionally, the sliding support (14) is fastened removably to the BOP stack (10) at its lower end.

Optionally, the skid (12) comprises at least one locking element (24a, 24b) for removably fastening the skid (12) on the structure of a rig (30).

Optionally, the at least one locking element is at least two arms (24a, 24b) connectable to the structure of a rig (30) by means of at least one fastening means.

According to a ninth aspect of the invention, there is provided a system for transporting and installing a BOP stack (10) for a land-based drilling rig, characterized in that it comprises a device for transporting and installing a BOP stack (10), as defined in the previous aspect, wherein a rig (30), positioned above the place of installation and aligned therewith, is suitable for: hoisting the BOP stack (10) by its end opposite to the end fixed to the sliding support (14) so as to lift the BOP stack (10) to a vertical position where the sliding support is positioned on the part of the skid (12) that extends on the place of installation (22); and lowering the BOP stack (10) in the vertical position to the place of installation (22) after disconnection thereof from the sliding support (14).

Optionally, the rig hoists the BOP stack (10) by at least one hoisting flange (32) fixed to the upper end of the BOP stack (10).

According to the tenth aspect of the invention, there is provided a method for transporting and installing a BOP stack (10) for a land-based drilling rig, characterized in that it comprises the steps of: a) transporting a BOP stack (10) to the vicinity of a place of installation (22) in a horizontal position by means of a device for transporting and installing a BOP stack (10), as defined in the eighth aspect; b) hoisting, by means of a rig (30) positioned above the place of installation (22) and aligned therewith, the BOP stack (10) by its end opposite to the end fixed to the sliding support (14) so as to lift the BOP stack (10) to a vertical position where the sliding support (14) is positioned on the part of the skid (12) that extends on the place of installation (22); c) disconnecting the sliding support (14) from the end of the BOP stack (10) to which the latter was fixed and displacing at least part of the skid (12) so as to unblock the entrance of the place of installation (22); and d) lowering the BOP stack (10) in its vertical position to the place of installation (22) by means of the rig (30) positioned above the place of installation (22) and aligned therewith.

Optionally, after the step of disconnecting the sliding support (14), it additionally comprises the step of moving the sliding support (14) in translation to the opposite end of the skid (12).

BRIEF DESCRIPTION OF THE FIGURES

The detailed description presented hereunder refers to the appended figures and their respective reference numbers.

DETAILED DESCRIPTION OF THE INVENTION

Firstly, it is emphasized that the description given hereunder will be based on a preferred embodiment of the invention. As will be obvious to a person skilled in the art, however, the invention is not limited to this particular embodiment.

Figure 3:
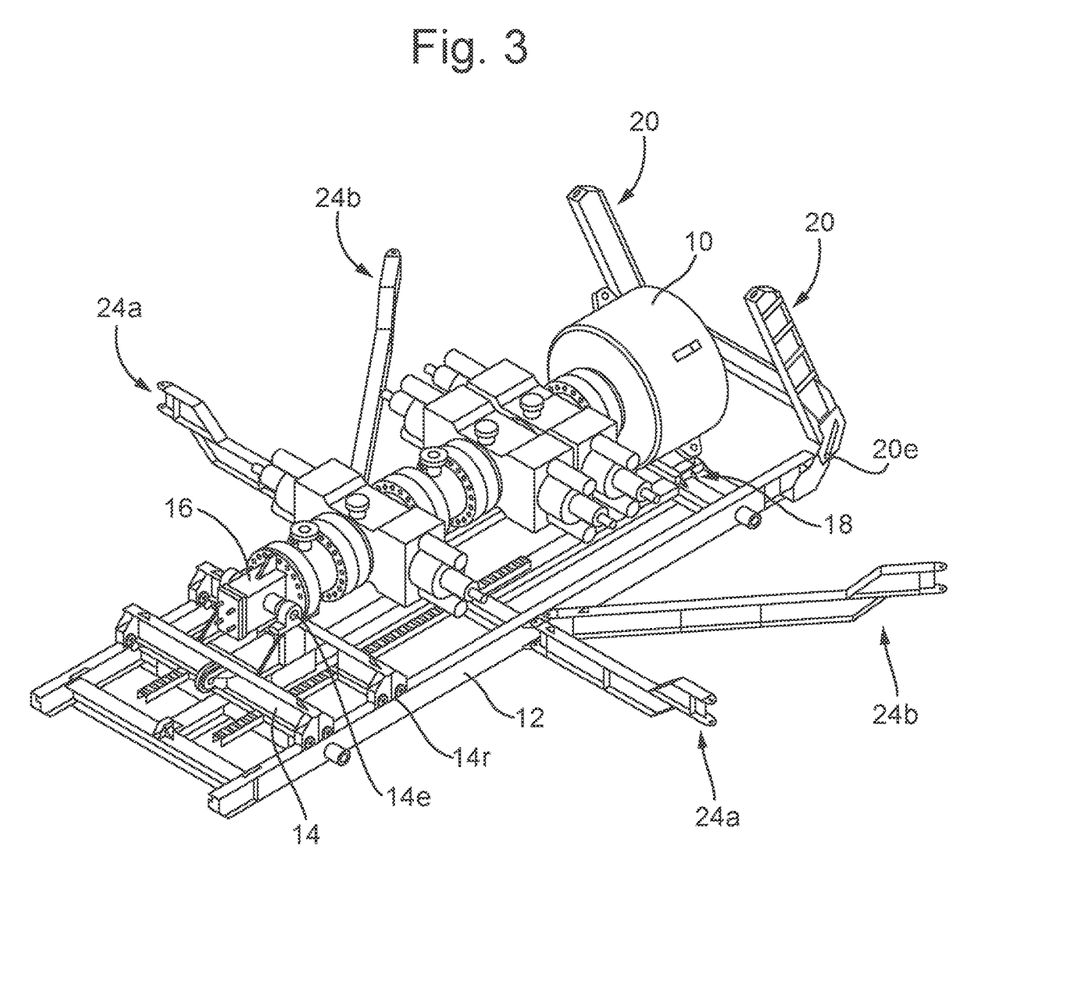
FIG. 3 shows an isometric view of the device for transporting and installing a BOP stack according to a preferred embodiment.

FIG. 3 shows an isometric view of the device for transporting and installing a blow out preventer (BOP) stack 10 according to a preferred embodiment. The device for transporting and installing a BOP stack 10 for a land-based drilling rig of the present invention will comprise a skid 12. The skid 12 can be formed by a metallic structure. The skid 12 is suitable for transporting the BOP stack 10 in the horizontal position, as illustrated in FIG. 3.

The device additionally comprises a moveable support 14. Moveable support 14 is suitable for being fixed removably to one end of the BOP stack 10. As such, moveable support 14 is suitable supporting part of the weight of the BOP stack 10. The moveable support 14 is thus a moveable BOP stack support. The moveable support 14 can be fixed removably to the BOP stack 10 at its lower end, taking into account its vertical operating position.

The moveable support 14 is additionally suitable for translating or moving longitudinally on at least part of the skid 12. The moveable support 14 can be a sliding support that can slide longitudinally on at least part of the skid, and is discussed as such in the following description. In some embodiments, the sliding support 14 slides along the entire length of the skid 12. The sliding can be on at least one rail. In such configurations, the sliding support 14 can comprise a set of wheels 14r that slide on the at least one rail of the skid 12, as illustrated in FIG. 3. Optionally, two rails are provided on the skid 12, one on each side, so that the sliding support 14 comprises at least two sets of wheels 14r.

The sliding support 14 can comprise a hinged fastening device 16 or other form of rotatable connector. The hinged fastening device 16 is suitable for fixing one end (most suitably, the lower end) of the BOP stack 10 to be hinged with respect to the sliding support 14. The sliding support 14 can comprise a hinge axis 14e about which the hinged fastening device 16 rotates. The hinged fastening device 16 can be fixed removably to the lower end of the BOP stack 10 by means of bolts and/or a flange (not shown).

The device further comprises at least one fixed support 18. Fixed support 18 has the function of supporting the BOP stack 10. Fixed support 18 supports the BOP stack 10 by supporting part of the weight of the BOP stack 10 when in its position of rest in the horizontal, as illustrated in FIG. 3. Fixed support 18 does not restrain the BOP stack 10, or connect to the BOP stack 10 during the procedure of installing the BOP stack 10. As discussed below, the end of the BOP stack supported by the fixed support 18 can be lifted (e.g. by a rig) so that the BOP stack comes out of contact with the fixed support whilst remaining connected to the moveable support 16.

At least part of the skid 12 on which the sliding support 14 slides is extendable longitudinally outwards from the end of the skid 12. As such, it can be extendable outwards, into an extended configuration, to be adjacent to or on the place of installation of the BOP stack 10. This means that at least part of the skid 12 on which the sliding support 14 slides can remain positioned on the place of installation of the BOP stack 10, throughout the installation of the BOP stack and indeed until its removal. In the depicted embodiment, the part 20 of the skid 12 that is extendable longitudinally outwards from the end of the skid 12 is a complement of the rails on which the sliding support 14 slides. In this way, the sliding support 14 is capable of sliding to a point at which it is positioned on the complement of the rails 20. Consequently, the sliding support 14 is capable of sliding so that it is positioned on the place of installation 22 of the BOP stack 10. As such, the section of the skid 12 that is extendable is a skid extension.

Thus, the complement of the rails 20 can extend at least partially on the place of installation 22 of the BOP stack 10 when the (rest of the) device is positioned adjacent to the place of installation 22.

The complement of the rails 20 that extends on the place of installation 22 of the BOP stack 10 is retractable. In the embodiment illustrated in FIG. 3, the complement of the rails 20 is hinged about an axis of retraction 20e. That comprises an axis of rotation, meaning that the complement of the rails 20 can be folded about axis of retraction 20e towards the opposite end of the skid 12. This reduces the length of the overall device and facilitates its transport and handling while the BOP stack is on the device in its horizontal position (FIG. 3). In other words, this represents one way in which the extendable section 20 of the skid 12 may be extended and retracted.

Alternatively, the complement of the rails 20 can be telescopically retractable relative to the body of the skid 12 (embodiment not shown).

To utilise the device described above, a rig 30 can be used. The rig 30 can be positioned above the place of installation 22 and aligned therewith, and can be suitable for:

i) hoisting the BOP stack 10 by its end opposite to the end fixed to the sliding support 14, so as to raise the BOP stack 10 to a vertical position where the sliding support 14 is positioned on the part of the skid 12 that extends on the place of installation 22 (e.g. the complement of the rails 20 in FIG. 3); and ii) lowering the BOP stack 10 in the vertical position to the place of installation 22 after disconnection thereof from the sliding support 14.

Figure 4:
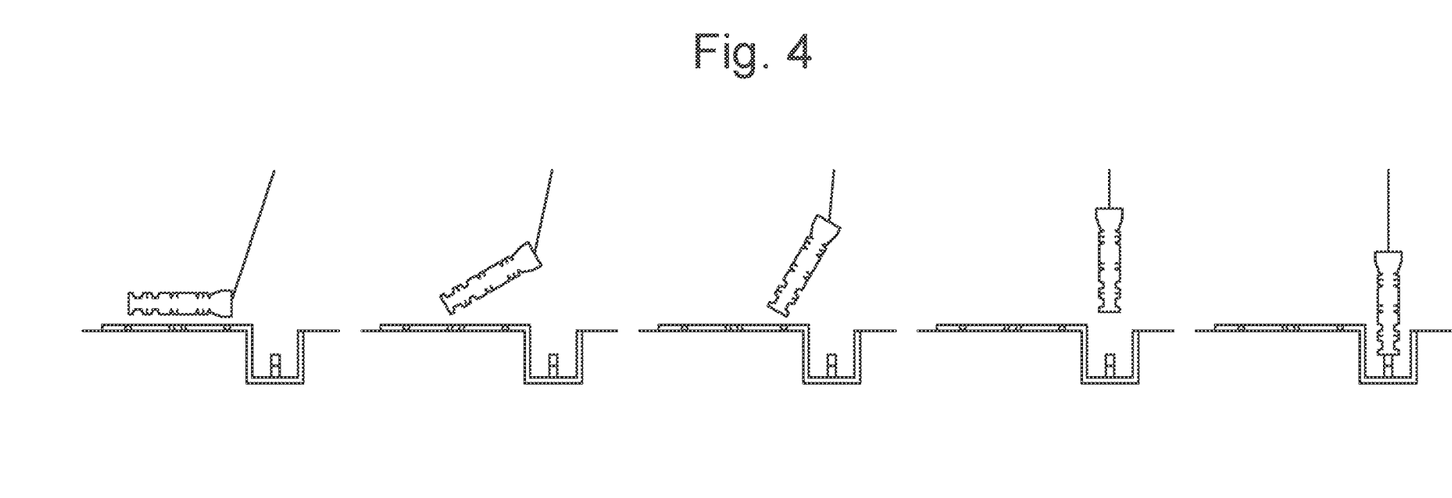
FIG. 4 shows a sequence of schematic side views of a method for transporting and installing a BOP according to the preferred embodiment.

FIG. 4 shows a sequence of schematic side views of a method for transporting and installing a BOP according to the preferred embodiment.

The skid 12 can comprise at least one locking element. The locking element can be for removably fastening the skid 12 within and/or to the structure of the drilling rig 30. The at least one locking element can be at least two arms 24a, 24b connectable to the structure of the drilling rig 30 by means of at least one fastening means.

In some embodiments, four arms connectable to the structure of the drilling rig are provided, two substantially orthogonal 24a to the side of the skid 12 and two inclined 24b relative to the side of the skid 12. These arms 24a, 24b have the function of coupling the device to the structure of the rig 30. This prevents the device and the rig 30 moving relative to one another when the BOP stack 10 is being lifted by the rig 30. The arms 24a, 24b are fixed to the structure of the rig 30 by means of pins.

FIGS. 5a to 5m illustrate, in a sequence of isometric views, individual steps of the method for transporting and installing the BOP stack 10 according to the preferred embodiment described above.

Figure 5A:
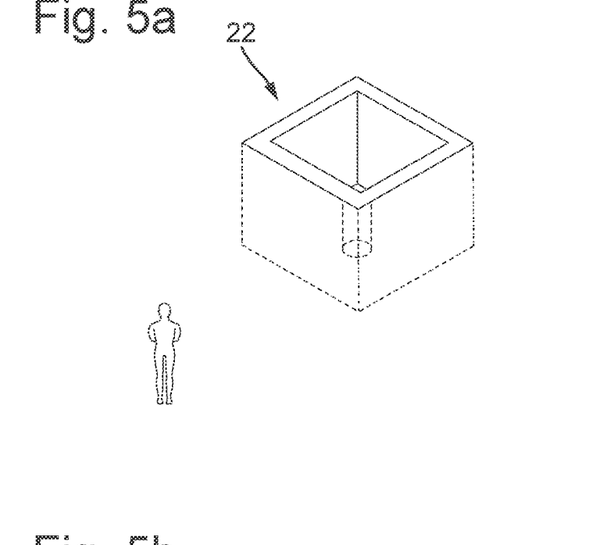
FIGS. 5a to 5m show a sequence of isometric views of the individual steps of a method for transporting and installing a BOP according to the preferred embodiment.
Figure 5B:
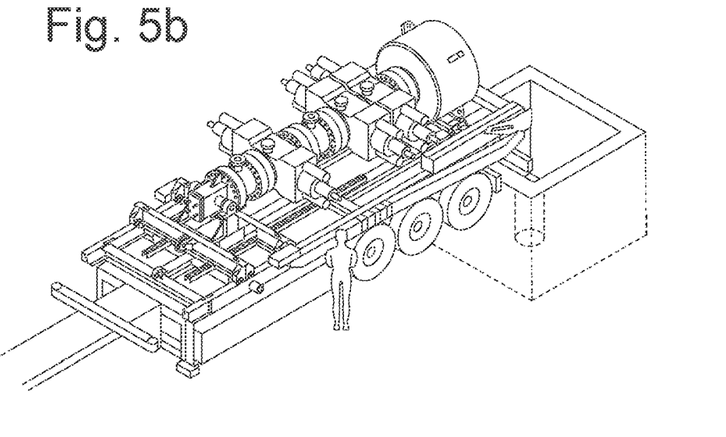
Figure 5C:
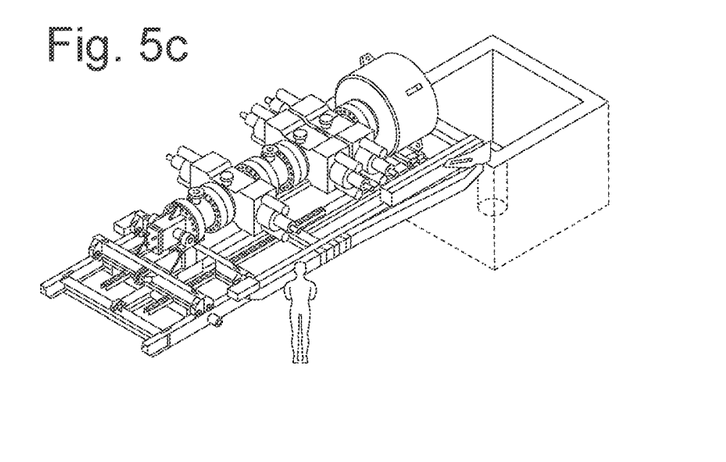
Figure 5D:
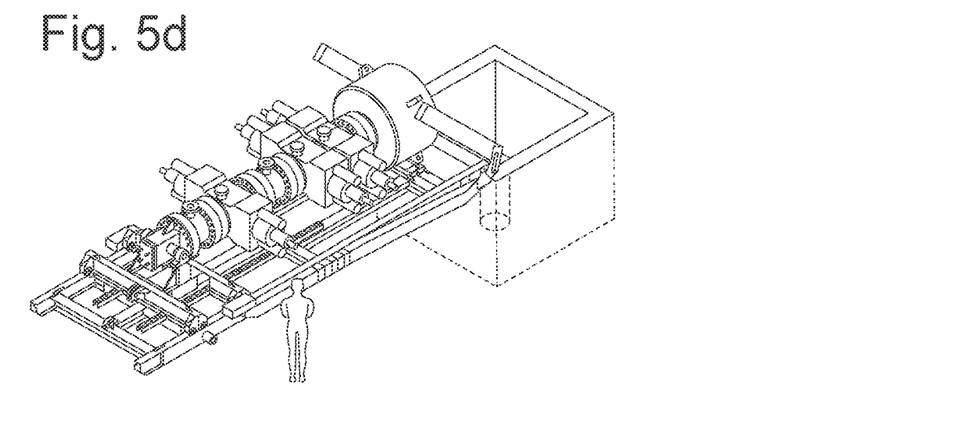
Figure 5E:
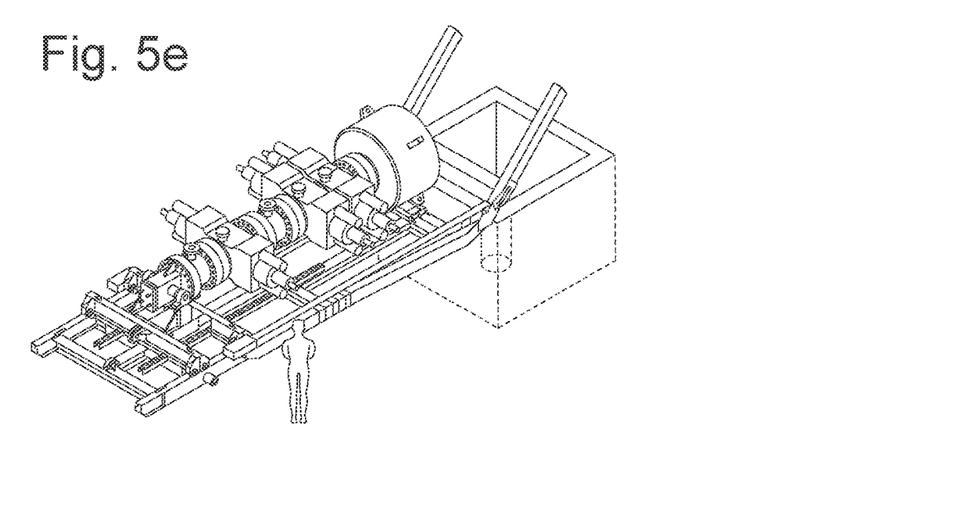
Figure 5F:
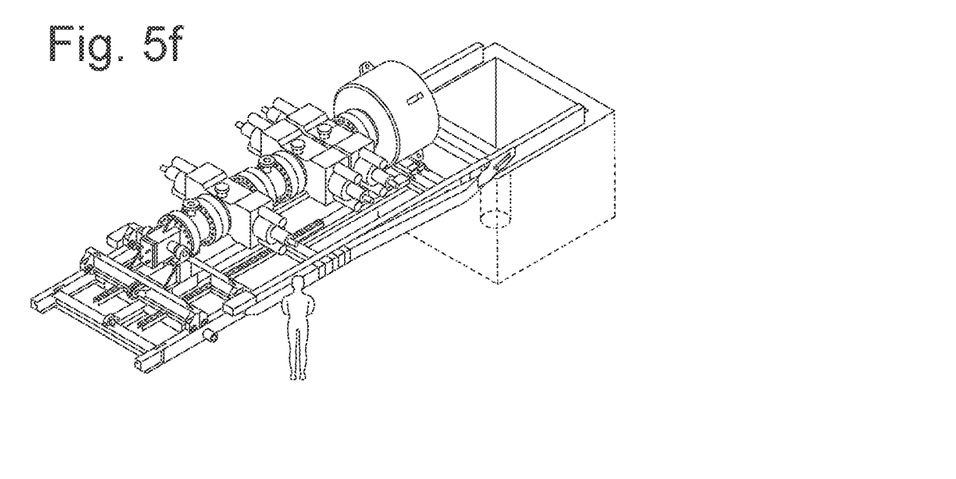
Figure 5G:
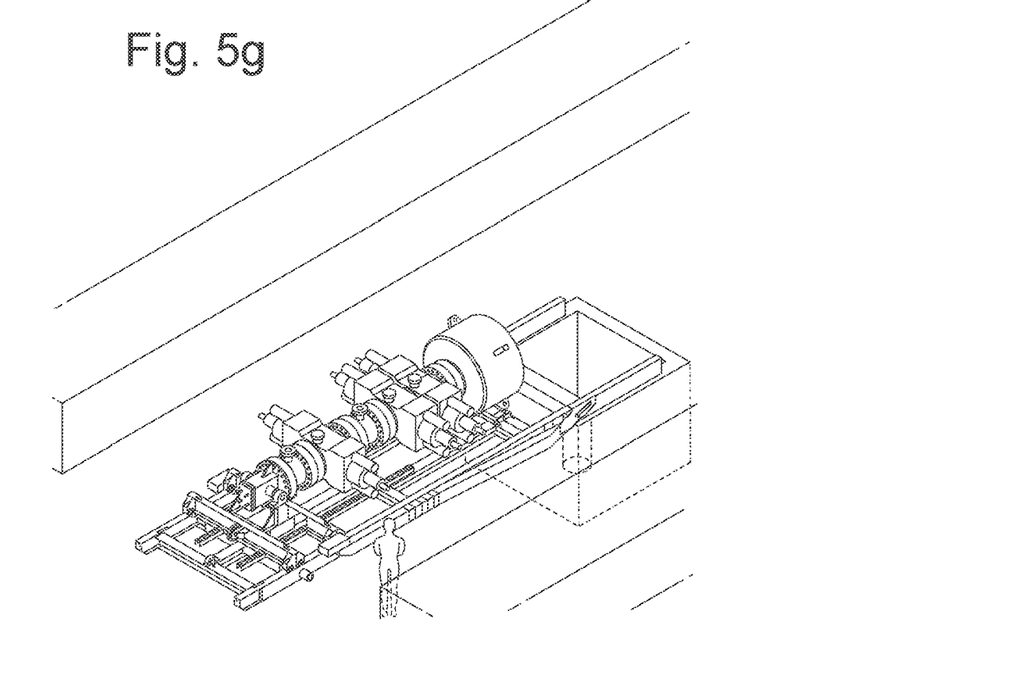
Figure 5H:
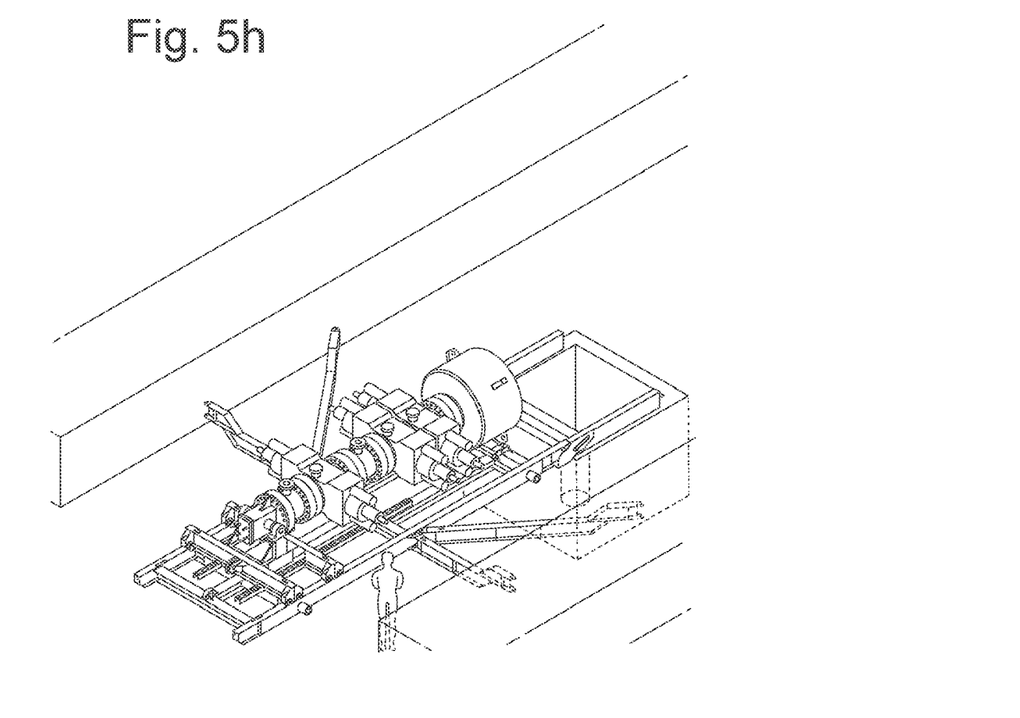
Figure 5I:
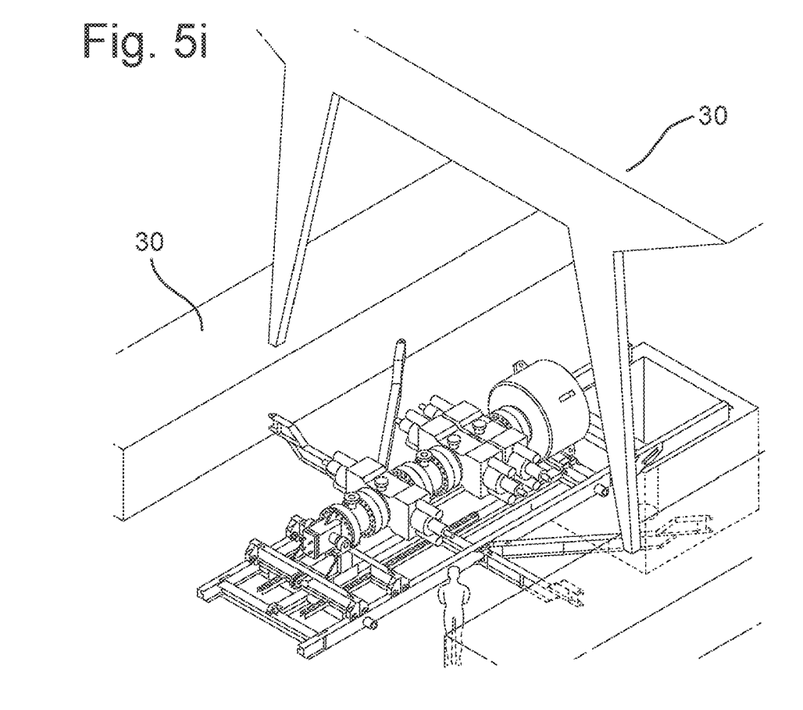

After earth-moving and construction of the pilot hole (place of installation 22), as shown in FIG. 5a, the BOP stack 10 is brought up to the site attached to the device for transporting and installing the BOP stack 10. The BOP stack 10 and the device can be aligned and positioned near the place of installation by means of a cart and cranes (FIGS. 5b and 5c). After positioning near the place of installation, the complement of the rails 20 of the device can be opened (FIGS. 5d, 5e and 5f) and extended on to the place of installation 22. That is the extendable part of the skid extends over and/or around the pilot hole 22. This allows translation of the sliding support 14 from the end of the skid 12 to the place of installation 22, over the pilot hole. After the device has been positioned, the rig 30 can be mounted on the place of installation 22 and to the device (FIGS. 5g, 5h and 5i). As can be seen, the arms 24a, 24b are fixed to the structure of the rig 30 to prevent relative movement between the rig 30 and the device. In this step, the device for transporting and installing the BOP stack 10 becomes an integral part of the rig 30, for the duration of the drilling of the well.

After assembly of the device on the structure of the rig 30 and before the start of drilling of the well, the BOP stack 10 is pulled/lifted by the rig winch by at least one steel cable that passes through a rotary table (not shown).

Figure 5J:
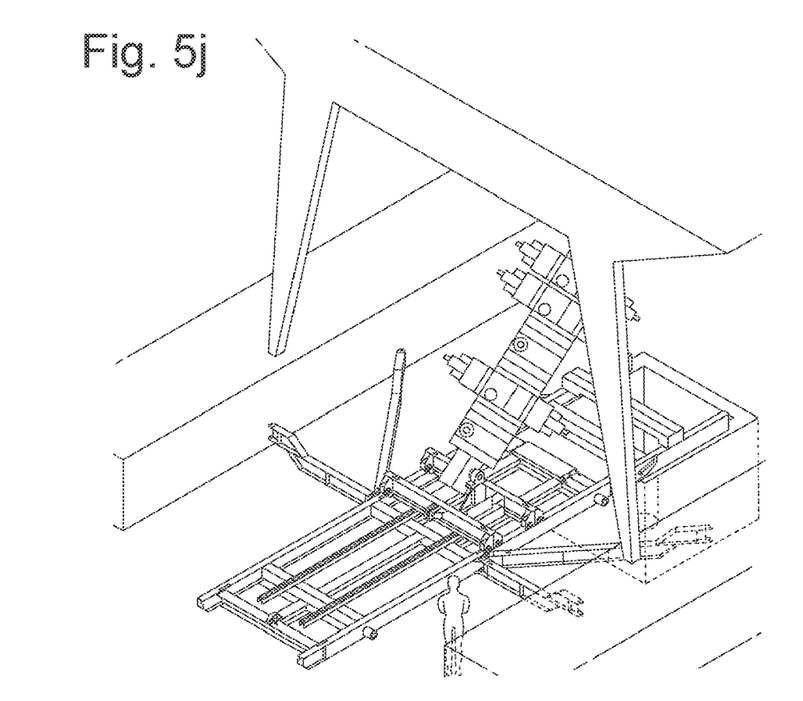
Figure 5K:
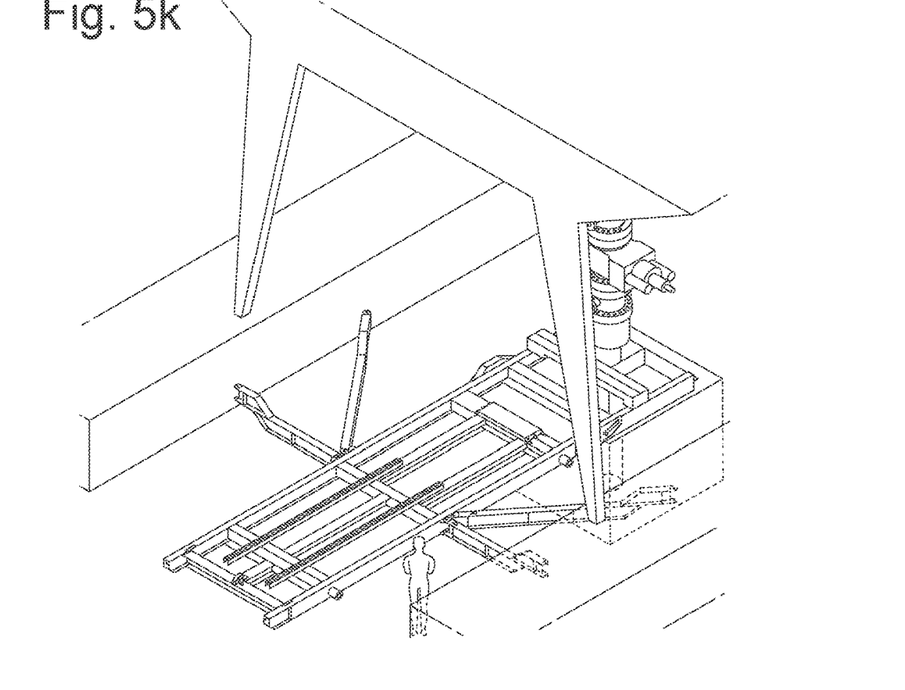
Figure 5L:
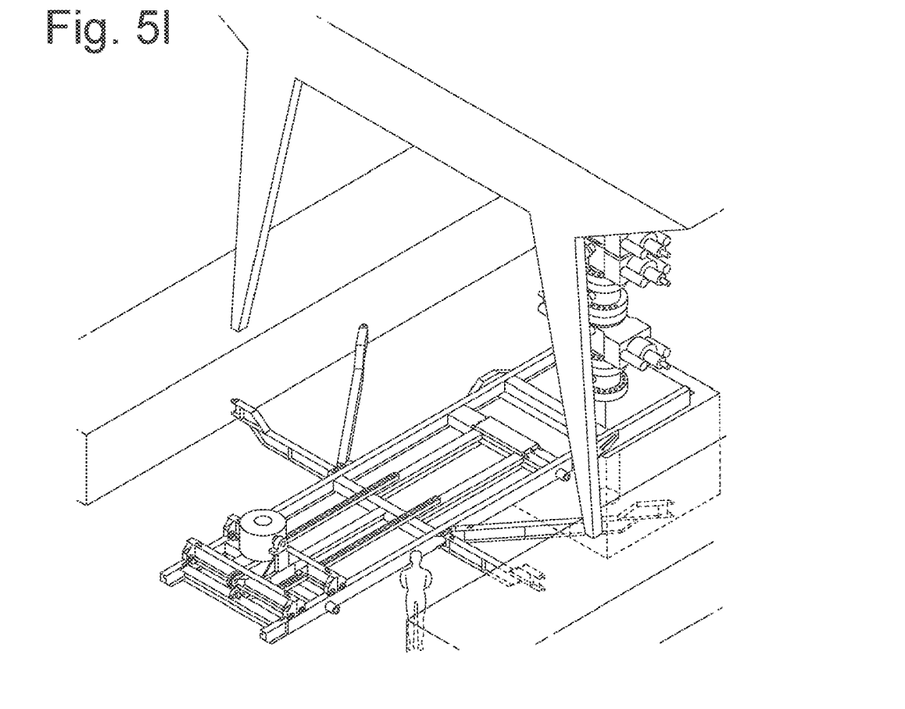
Figure 5M:
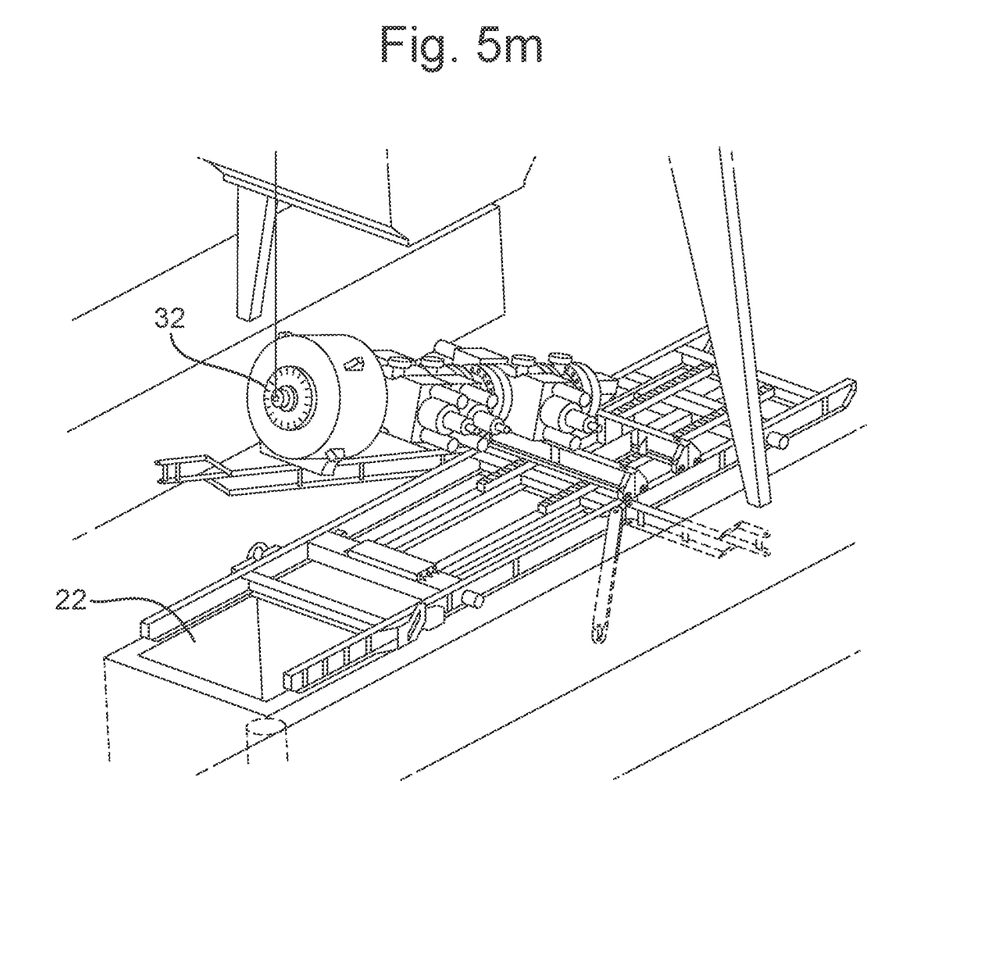

The rig 30 can pull/lift the BOP stack 10 by at least one hoisting flange 32 fixed to the upper end of the BOP stack 10 (FIG. 5m—N.B FIG. 5m shows the arrangement from the opposite direction to FIGS. 5a-5l, to better show the hoisting flange 32). This tool supports a force compatible with the weight of the BOP stack (40 tons, for example), and is capable of safely lifting the BOP stack. The upper end of the BOP stack 10 is, in the horizontal position, the end positioned closes to the installation position 22 (i.e. the end closest to the end of the device having the complement of the rails 20).

As it is lifted, the BOP stack 10 gradually advances from the horizontal position to the vertical position to be positioned on the place of installation 22 (the well), as illustrated in FIGS. 5j, 5k and 5l. That is, as the end connected to the hoisting flange 32 (which is the end closest to the installation position) is lifted, the other (lower) end, which is connected to the hinged fastening device 16, slides along the skid 12 on the sliding support 14 and onto the complement of the rails 20, until the BOP stack is positioned vertically over the place of installation 22 and the well.

Next, the fasteners (bolts, for example) that connect the hinged fastening device 16—and consequently the sliding support 14—to the BOP stack 10 can be removed. The sliding support 14 can then be moved in translation to the opposite end of the skid 12 (see FIG. 5l). In other words, the sliding support can be moved out of the way, to allow installation of the BOP stack 10 whilst the device is still in place. After movement of the sliding support 14, the BOP stack 10 can then be installed on the place of installation 22 (the well).

Thus, the device for transporting and installing a BOP stack 10 and with the rig 30 form a system for transporting and installing a BOP stack 10. As mentioned, the rig 30 is positioned above the place of installation 22 and aligned therewith. The rig is suitable for (i) hoisting the BOP stack 10 by its end opposite to the end fixed to the sliding support 14, so as to raise the BOP stack 10 to a vertical position where the sliding support is positioned on the part of the skid 12 that extends on or around the place of installation and (ii) lowering the BOP stack 10 in the vertical position to the place of installation 22 after disconnection thereof from the sliding support 14.

In addition, a method for transporting and installing a BOP stack 10 for a land-based drilling rig, can comprise one or more of the steps of:

a) transporting the BOP stack 10 to the vicinity of the place of installation 22 in a horizontal position by means of a device for transporting and installing a BOP stack 10, as described above;

b) hoisting, by means of the rig 30 positioned above the place of installation and aligned therewith, the BOP stack 10 by its end opposite to the end fixed to the sliding support 14 so as to raise the BOP stack 10 to a vertical position where the sliding support 14 is positioned on the part of the skid 12 that extends on the place of installation 22;

c) disconnecting the sliding support 14 from the end of the BOP stack 10 at which it was fixed and displacing at least part of the skid 12 so as to unblock the entrance of the place of installation 22; and d) lowering the BOP stack 10 in its vertical position to the place of installation 22 by means of the rig 30 positioned above the place of installation 22 and aligned therewith.

The method can comprise the step of moving the sliding support 14 in translation to the opposite end of the skid 12, as shown in FIG. 5l. However, the sliding support 14 need not move all the way to the opposite end of the skid 12 to enable the BOP stack to be installed at the place of installation 22.

Thus, the present disclosure provides a device, a system and a method for transporting and installing a BOP stack 10 that utilizes the power of the drilling rig for safely lifting and installing the BOP stack. The simplicity of the device and system means that the cost of this technique is far lower than that of the hydraulic transporters of the prior art, generating a large saving on these methods while at the same time providing a technique that is sufficiently safe for transporting and installing a BOP stack.

Furthermore, improvised methods that put the users at risk are avoided with the technique presented in the present description.

Countless variations falling within the scope of protection of the present application are permitted. This reinforces the fact that the present invention is not limited to the particular configurations/embodiments described above. Modifications of the above-described apparatuses and methods, combinations between different variations as practicable, and variations of aspects of the invention that are obvious to those of skill in the art are intended to be within the spirit and scope of the claims.

The invention claimed is:

1. A device for transporting and installing a blow out preventer (BOP) stack for a land-based drilling rig, comprising:
    a skid for transporting a BOP stack in a substantially horizontal position; and
    a moveable support configured to be removably fixed to one end of the BOP stack and to translate longitudinally on the skid,
    wherein a section of the skid is extendable longitudinally outwards by rotating the section of the skid from an end of the skid into an extended configuration in which the section is configured for placement that is at least one of adjacent to or on a place of installation of the BOP stack, and
    wherein the section of the skid is configured to be part of the skid on which the moveable support is configured to translate, so that the moveable support is longitudinally translatable onto the section of the skid, in its extended configuration, to be above the place of installation.

2. The device according to claim 1, wherein the skid comprises at least one rail, and the moveable support is configured to slide longitudinally on the at least one rail.

3. The device according to claim 2, wherein a portion of the at least one rail is part of the section of the skid that is extendable longitudinally outwards, such that the portion of the at least one rail is configured to extend on the place of installation of the BOP stack when the device is positioned adjacent to the place of installation.

4. The device according to claim 1, wherein the section of the skid that is extendable longitudinally is retractable.

5. The device according to claim 1, wherein the moveable support comprises a hinged fastening device configured to fix one end of the BOP stack to be hinged with respect to the moveable support.

6. The device according to claim 5, wherein the moveable support comprises a hinge axis about which the hinged fastening device rotates.

7. The device according to claim 1, wherein the moveable support is configured to be removably fastened to the lower end of the BOP stack.

8. The device according to claim 1, wherein the skid comprises at least one locking element for removably fastening the skid on or to a structure of a rig.

9. The device according to claim 8, wherein the at least one locking element comprises at least two arms.

10. A system for transporting and installing a blow out preventer (BOP) stack for a land-based drilling rig, the system comprising:
    a device for transporting and installing a BOP stack including:
        a skid for transporting a BOP stack in a substantially horizontal position; and
        a moveable support configured to be removably fixed to one end of the BOP stack and to translate longitudinally on the skid,
        wherein a section of the skid is extendable longitudinally outwards by rotating the section of the skid from an end of the skid into an extended configuration in which the section is configured for placement that is at least one of adjacent to or on a place of installation of the BOP stack, and
        wherein the section of the skid is configured to be part of the skid on which the moveable support is configured to translate, so that the moveable support is longitudinally translatable onto the section of the skid, in its extended configuration, to be above the place of installation; and
    a rig.

11. The system according to claim 10, wherein the rig is positionable to be aligned above a place of installation of the BOP stack at which the device for transporting and installing a BOP stack is positioned carrying a BOP stack, and
    wherein the rig is configured to hoist the BOP stack by an end of the BOP stack opposite to an end fixed to the movable support so as to lift the BOP stack to a vertical position where the movable support is positioned on the section of the skid that extends on the place of installation, and
    wherein the rig is configured to lower the BOP stack in the vertical position to the place of installation after disconnection of the BOP stack from the movable support.

12. The system according to claim 10, further comprising:
    the BOP stack, wherein the BOP stack comprises at least one hoisting flange fixed to an upper end of the BOP stack,
    and wherein the rig is configured to hoist the BOP stack by the at least one hoisting flange.

13. A method for transporting and installing a blow out preventer (BOP) stack for a land-based drilling rig, comprising:
    transporting a BOP stack to a vicinity of a place of installation in a substantially horizontal position using a device for transporting and installing a BOP stack; and
    hoisting, using a rig positioned above the place of installation and aligned therewith, the BOP stack by a top end of the BOP stack so as to:
        lift the top end of the BOP stack away from the device for transporting and installing the BOP stack, and
        bring the BOP stack into a vertical position wherein a bottom end of the BOP stack remains attached to the device for transporting and installing the BOP stack via a moveable support of the device for transporting and installing the BOP stack, wherein the BOP stack is positioned above the place of installation, and wherein a portion of the movable support is coupled proximal to the bottom end of the BOP stack.

14. The method according to claim 13, further comprising:
    disconnecting the moveable support from the bottom end of the BOP stack; and
    displacing the moveable support so as to unblock an entrance of the place of installation.

15. The method according to claim 13, further comprising:
    lowering the BOP stack in its vertical position to the place of installation using the rig.

16. The method according to claim 15, wherein the lowering the BOP stack further comprises:
   leaving the device for transporting and installing the BOP stack in place during the lowering.

17. The method according to claim 13, further comprising:
   connecting the device for transporting and installing the BOP stack to the rig before the hoisting the BOP stack.

18. The method according to claim 13, wherein the device for transporting and installing a BOP stack includes:
   a skid for transporting the BOP stack in the substantially horizontal position; and
   the moveable support configured to be removably fixed to one end of the BOP stack and to translate longitudinally on the skid,
      wherein a section of the skid is extendable longitudinally outwards from an end of the skid, into an extended configuration in which the section is configured for placement that is at least one of adjacent to or on the place of installation of the BOP stack, and
      wherein the section of the skid is configured to be part of the skid on which the moveable support is configured to translate, so that the moveable support is longitudinally translatable onto the section of the skid, in its extended configuration, to be above the place of installation.

19. A device for transporting and installing a blow out preventer (BOP) stack for a land-based drilling rig, comprising:
   a skid for transporting a BOP stack in a substantially horizontal position;
   a moveable BOP stack support configured to move along the skid; and
   a skid extension, moveable between an extended position and an unextended position,
   wherein the moveable BOP stack support is configured to move along the skid extension when the skid extension is in the extended position, and
   wherein the moveable BOP stack support comprises a rotatable connector for connecting to a bottom end of the BOP stack, such that the moveable BOP stack support is moveable along the skid while remaining connected to the bottom end of the BOP stack when a second end of the BOP stack is lifted, and wherein a portion of the movable BOP stack support is coupled proximal to the bottom end of the BOP stack.

\* \* \* \* \*